LEAD STRAIGHTENER DEVICE

Filed Oct. 28, 1959 6 Sheets-Sheet 1

INVENTORS
Bill Eugene Wright &
Arnold Maury Walkow
BY Stevens, Davis, Miller & Mosher
ATTORNEYS LEAD STRAIGHTENER DEVICE
Filed Oct. 28, 1959 6 Sheets-Sheet 2
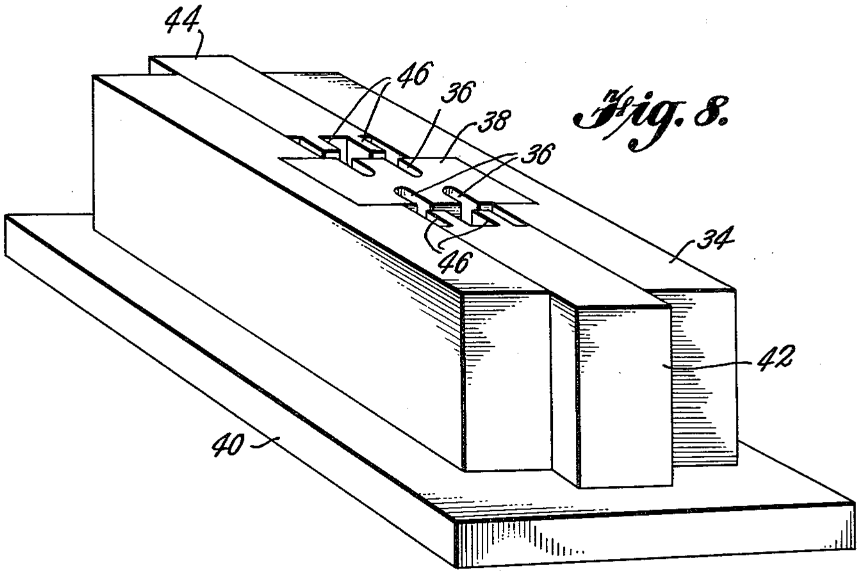
Fig. 8.
Fig. 9. Fig. 10. Fig. 11. Fig. 12.
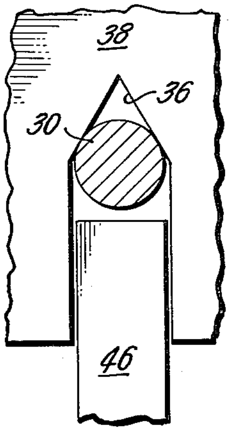
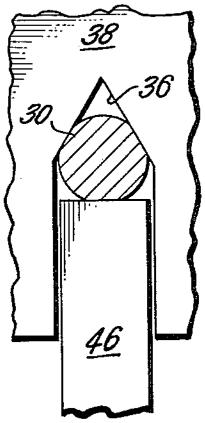
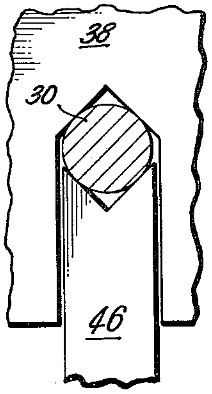
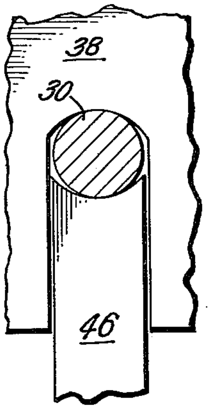
INVENTORS
Bill Eugene Wright &
Arnold Maury Walkow
BY Stevens, Davis, Miller & Mosher
ATTORNEYS

LEAD STRAIGHTENER DEVICE

Filed Oct. 28, 1959 6 Sheets-Sheet 3

INVENTORS
Bill Eugene Wright &
Arnold Maury Walkow
BY Stevens, Davis, Miller & Mosher
ATTORNEYS INVENTORS
BILL EUGENE WRIGHT &
ARNOLD MAURY WALKOW
BY Stevens, Davis, Miller & Mosher
ATTORNEYS INVENTORS
Bill Eugene Wright
& Arnold Maury Walkow
BY Stevens, Davis, Miller & Mosher
ATTORNEYS INVENTORS
Bill Eugene Wright &
Arnold Maury Walkow
BY Stevens, Davis, Miller & Mosher
ATTORNEYS United States Patent Office 3,106,945

Patented Oct. 15, 1963

3,106,945
LEAD STRAIGHTENER DEVICE

Bill E. Wright and Arnold M. Walkow, Dallas, Tex., assignors to Texas Instruments Incorporated, Dallas, Tex., a corporation of Delaware Filed Oct. 28, 1959, Ser. No. 849,275
8 Claims. (Cl. 140—147)

The present invention relates to a lead straightening device and more particularly to a lead straightening device providing a predetermined lead orientation pattern.

Generally, in assembling electronic components having a plurality of long, flimsy leads, it is desirable to align and space the leads according to a predetermined pattern. Presently used lead orientation devices are, for example, merely punch and die devices without facilities to arrange, guide and straighten the leads automatically in a predetermined pattern. To facilitate the economical production of electronic components with appending leads, it would be desirable to have a lead straightening device permitting the placing of any number of leads in a predetermined pattern expeditiously and automatically.

In its preferred form, the present invention comprises a movable holder mounting thereon an electronic component, such as a transistor, a comb structure engaging the leads and cooperating with a slidable prong member to provide a predetermined lead orientation pattern. Predetermined actuation of the comb assembly and prong member places the leads within the vicinity of a lead receptacle. When the ends of the leads are in the desired lead orientation pattern, the holder is actuated to insert each lead into its respective receptacle defined within a lead straightener device. The transistor may be removed by simply raising the holder and disengaging the comb structure and the slidable prong member therefrom. If necessary, in the mass handling of transistors, the holder may comprise an elongated structure capable of holding a large number of transistors in line or in any other expeditious manner to facilitate the quantity straightening of transistor leads. It will be obvious that the comb and prong assembly can be utilized with any number and types of transistor leads.

An object of the present invention is the provision of a transistor lead inserting and straightening device for placing the transistor leads in a predetermined orientation pattern.

Another object is to provide a lead straightening device which places the leads in a desired orientation pattern, lowers them into a lead straightener and, in turn, removes the straightened leads at a predetermined period in the operation cycle.

A further object of the invention is the provision of a transistor lead straightening device for placing long, flimsy leads in a proper lead orientation pattern by a process suitable for a large quantity operation.

Other objects and many of the attendant advantages of this invention will be readily appreciated as the same become better understood by reference to the following detailed description and appended claims when considered in connection with the accompanying drawings, in which like reference numerals designate like parts throughout the figures thereof and wherein:

FIGURE 8 is a perspective view of a lead straightener utilized with the comb and prong assembly;

FIGURE 9 is a plan view of one of the lead receptacles of the device of FIGURE 8;

FIGURE 10 is a plan view of the receptacle section of the device illustrating the deformation required in each lead to straighten it;

FIGURE 11 is a plan view of a modification of the receptacle design of FIGURE 9;

FIGURE 12 is a plan view of another receptacle modification;

Figure 5:
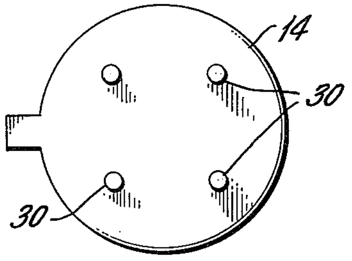
FIGURE 5 is a plan view of a typical lead pattern in a transistor having three or four leads.

Referring now to the drawings, there is illustrated a preferred embodiment of a transistor lead straightening device 10 having a holder means 12 securely supporting therein a transistor 14. A slidable prong means 16 and comb means 18 are provided with the holder means to facilitate the straightening of the transistor leads by placing them in a desired pattern. In disclosing the present invention, the preferred embodiment is shown in cooperation with a transistor having a lead pattern as shown in FIGURE 5.

The holder means 12 is formed with a pair of coplanar holding members 20 and 22 having oppositely facing groove means 24 and 26, respectively, for mounting therein the header portion 15 of the transistor 14. If desired, the holding members 20 and 22 may be elongated to mount thereon a plurality of juxtaposed transistors to facilitate the quantity handling of transistors.

The prong means 16 is formed as an elongated member having a sharp point 28 for projecting into the leads 30 of the transistor to part them in preparation for the next operation. The prong may be actuated either manually or by power means through such conventional devices as a hydraulic piston, a solenoid, or the like, operatively coupled thereto. The prong is slidable in a plane parallel to the plane of the holding members 20 and 22, and mounted on a base structure, not shown, capable of independent vertical movement with respect to the holder 12.

Figure 6:
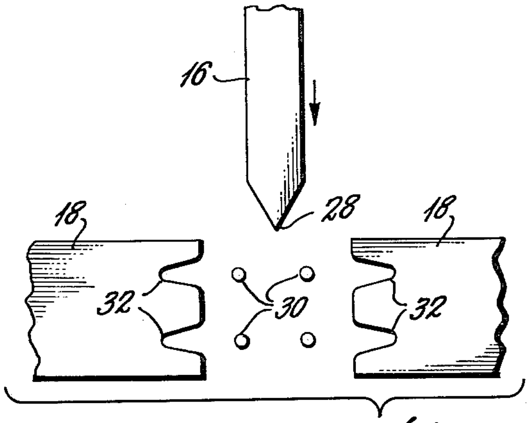
FIGURE 6 is a plan view of the comb and prong assembly of the preferred embodiment shown in operative association with the leads.
Figure 7:
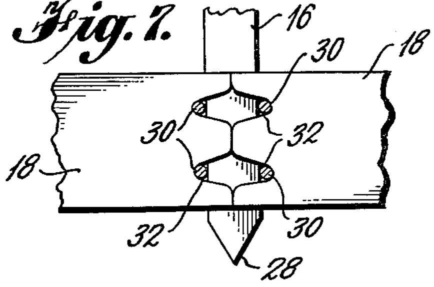
FIGURE 7 is a plan view of the comb and prong assembly in a closed position showing the desired lead orientation pattern.

The comb means 18, as seen in FIGURES 6 and 7, is provided with a number of integral lead indents 32, and is capable of relative movement in a horizontal plane parallel to and spaced from the plane of the prong 16. The slidable comb members and the prong 16, if desired, may be mounted on a single base structure having suitable and conventional control means, not shown, which are predeterminately set to actuate the comb member. In turn, the prong 16 will be actuated in its horizontal plane toward and through the leads, as shown in FIGURE 7.

FIGURES 1 through 4 illustrate the preferred sequence in the use of the embodiment 10 wherein the leads of the transistor 14 are placed in a fixed lead orientation pattern and then inserted into a lead straightener 34 having receptacles arranged in the equivalent lead orientation pattern. Obviously, the lead straightener may be of any desired type or configuration, and may be adapted for use with any number of leads.

In the operation of the preferred embodiment 10, the transistor 14 is inserted into the holder 12 so that the grooves 24 and 26 support the transistor header portion 15. The two portions of the comb means 18 are actuated toward each other to place the leads in between the indents 32 in approximately the desired orientation pattern. The leads are then parted and separated into the exact desired pattern by sliding the prong 16 through the leads, as shown in FIGURE 7.

Figure 3:
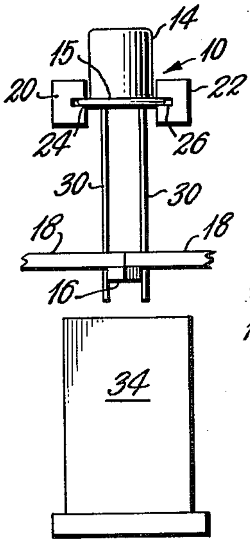
FIGURE 3 is a side elevational view of a further step in the operation.
Figure 4:
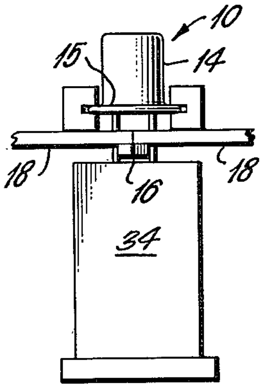
FIGURE 4 is a side elevational view of the insertion of the leads in a lead straightener.

As seen from FIGURES 3 and 4, the comb and prong assembly moves downward on the leads 30 and stops in the vicinity of the lead straightener 34. In turn, the ends of the leads are inserted into the straightener by the downward movement of the holder. As previously stated, a plurality of transistors may be placed in an in-line position on an elongated holder 12 so that the lead inserting operation can be performed with a large number of transistors being inserted into a corresponding number of lead receptacles. If desired, suitable and conventional actuation means, not shown, can be provided in operative association with the comb and prong actuating means to provide comb and prong retraction for full seating of the holder 14 on the receptacle. When desired or necessary, the transistor is removed from the lead straightener 34 by raising the holder 12, with or without raising the prong and comb assembly.

Figure 1:
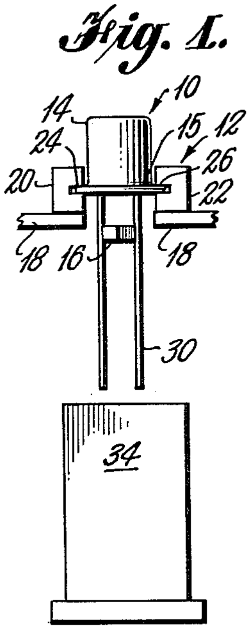
FIGURE 1 is a side elevational view of the preferred embodiment of the invention in an initial stage of operation.
Figure 2:
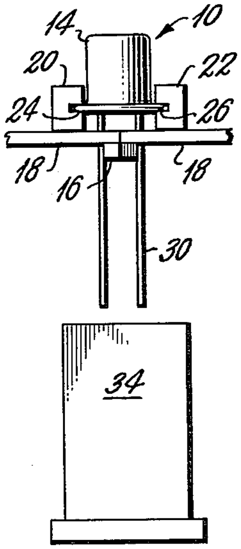
FIGURE 2 is a side elevational view of the preferred embodiment in another stage of the operation.

FIGURE 8 shows the lead straightener 34 used with the preferred embodiment 10 in straightening each transistor lead. The holder 12 is placed over the lead straightener and each lead is placed directly over a corresponding die aperture 36, in the same manner as shown in FIGURE 1. The die apertures or indents are formed in a die 38 mounted on a supporting die structure 40 provided with slidable punch members 42 and 44. The punch members are formed with a plurality of integral punch fingers 46, each cooperating with a respective indent 36.

The operation of the preferred embodiment 10, including the lead straightener 34, is as shown in FIGURES 1 through 4. After the leads have been inserted within their respective indents 36, a suitable and conventional actuating means, such as a hydraulic clamp device, or the like, actuates the punch members 42 and 44, with their integral fingers 46, to straighten the leads by the expedience of exceeding the elastic limit of the material parallel to the axis of the leads. The elastic limit of each lead is obtained by applying a suitable actuating force to the punch members 42 and 44 to force the punch fingers 46 with sufficient force against their respective leads thus to straighten them and modify their circular cross-section to a slightly deformed cross-section as shown in FIGURE 10. To facilitate the straightening of the leads, FIGURE 9 discloses a preferred configuration for the indents 36, wherein the sides are tapered to a point. In addition, each indent is formed with an opening slightly larger than the width of the coacting finger 46 to facilitate the operative coaction therebetween.

FIGURES 11 and 12 illustrate optional configurations of the indents 36 and cooperating punch fingers 46 to accommodate different types of leads or lead materials. These configurations embody indents and punch fingers with radii larger than the radius of the lead. It will be obvious that the lead straightener 34 may be modified in any desired manner to facilitate the assembly or straightening of various types of transistor leads.

In brief, FIGURE 8 illustrates a lead straightener 34 used for the partial, semicircular deformation of the leads 30. This deformation results in the leads being straightened in all directions since the deformation occurs uniformly with respect to the lead axes. The disclosed apparatus facilitates the simultaneous straightening of adjacent transistor leads in an expeditious and accurate manner, since bent or crooked, long and flimsy leads can be quickly inserted and processed within the indents 36 without the possibility of folding leads completely out of the orientation range of the receptacle.

Figure 17:
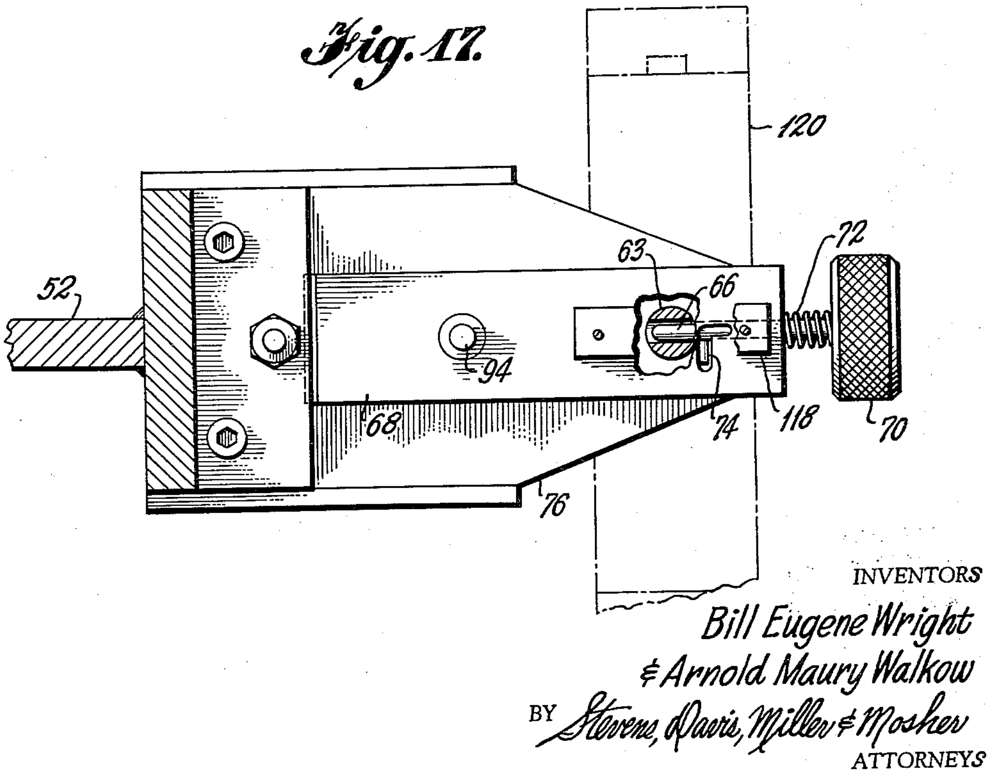
FIGURE 17 is a sectional view of the device of FIGURE 14 taken on the line 17—17, looking in the direction of the arrows.
Figure 16:
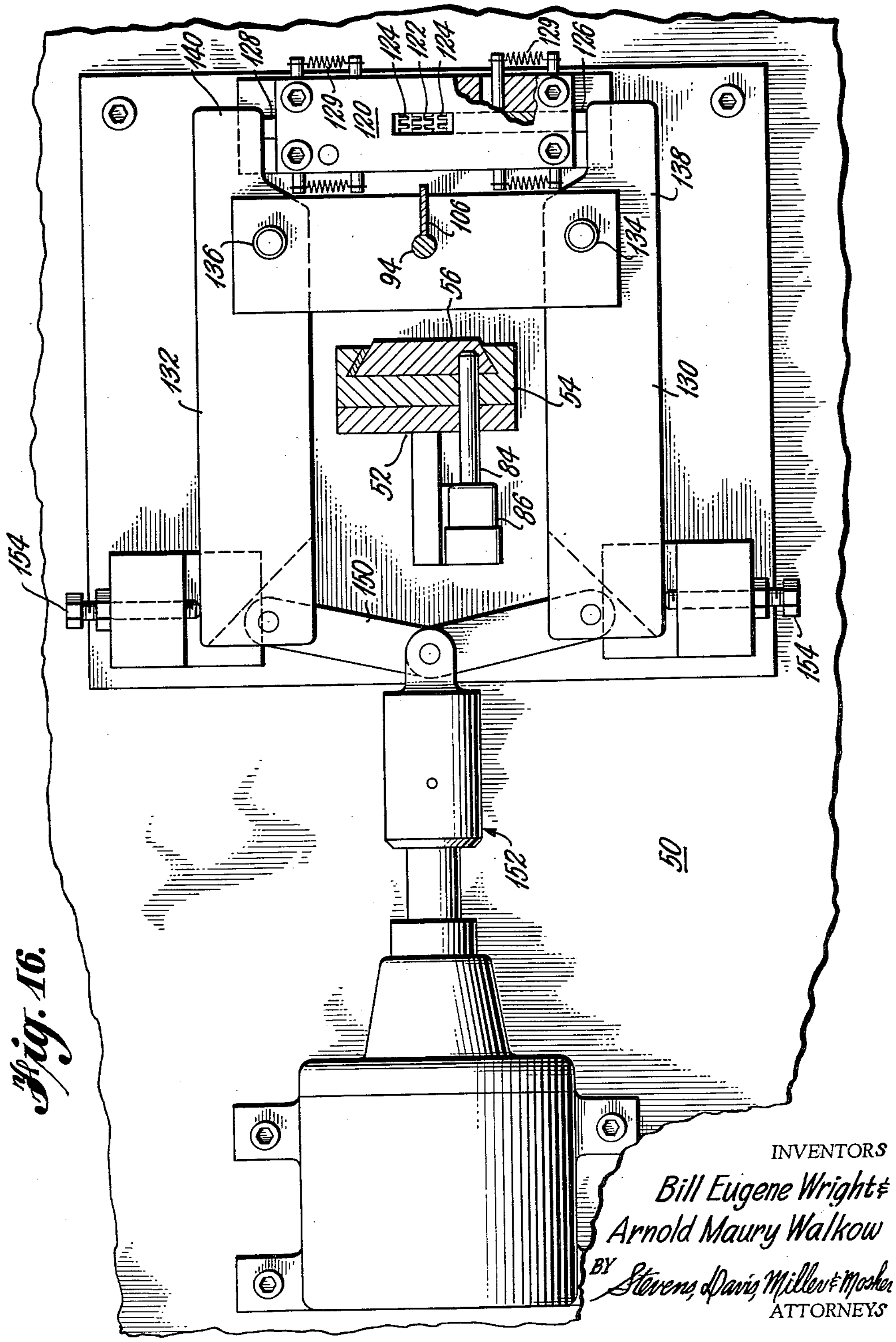
FIGURE 16 is a sectional view of the device of FIGURE 14 taken on the line 16—16, looking in the direction of the arrows.

FIGURES 13 through 16 show an illustrative example 48 of the present invention as actually utilized in a transistor fabricating plant. The embodiment 48 comprises a base assembly 50 with an upright frame portion 52 securely fixed thereto. Fixed to the frame 52 is a vertically grooved member 54 operatively coacting with a vertically slidable member 56 (see FIGURE 15) mounted therein. An air piston and cylinder assembly 60 is mounted on the frame 52 through an intermediate bracket member 62. The piston rod of assembly 60 is connected to a header push rod 63 provided with a pin slot 64 coacting with a pin 66 supported on a bracket assembly 68 attached to the vertical member 56. The pin 66 is provided with a knurled knob 70 spring biased away from the assembly 68 by a spring 72. The pin is locked in a predetermined position through a locking pin 74, integral therewith and at a right angle thereto, actuated by turning the knob 70, as seen in FIGURE 17. It can be seen that the header push rod 63 has limited movement relative to the pin 66, due to the configuration of the pin slot 64 provided in the rod. The push rod 63 is slidably journaled in a bushing bracket 76 fixed to the frame 52, and is provided at its lower end with a transistor can retainer 78 for suitably supporting in an integral transistor holder 80 the transistor with its leads protruding therethrough.

Figure 15:
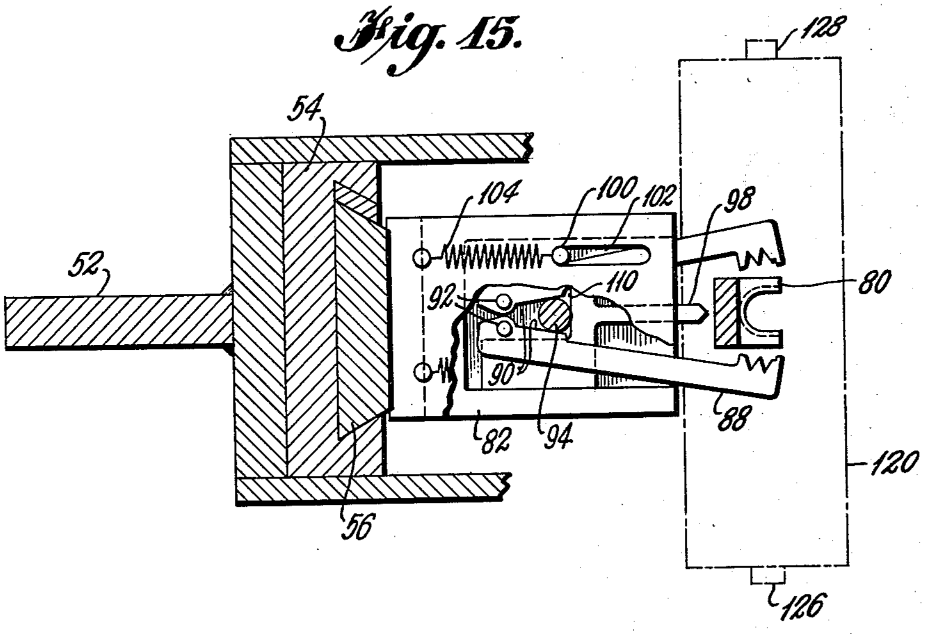
FIGURE 15 is a sectional view of the device of FIGURE 14 taken on the line 15—15, looking in the direction of the arrows.

A comb and prong housing assembly 82 is fixed to the vertical slide member 56 and slidable therewith within the vertical member 54. A pin 84, actuated by a switch 86, is provided to maintain the member 56 in a relatively fixed position with respect to the member 54. The comb and prong assembly, as shown in FIGURE 15, includes comb arms 88 pivotally mounted at one end on pins 90 supported in the housing assembly 82. Opposed cam surfaces 92 are located on the comb arms and they coact with a vertically slidable rod 94 projecting through the assembly 82. Rod 94 projects from an air piston and cylinder assembly 96 and when reciprocated serves to pivot the comb arms about the pins 90. A prong 98 is provided in the assembly 82 having a number of pins 100, only one being shown in FIGURE 15 since the structure is merely duplicated, projecting through slots 102 formed in the housing assembly 82. Springs 104 bias the pins 100 towards the end of the slot 102 to maintain the prong 98 in a retracted position against the rod 94.

Figure 13:
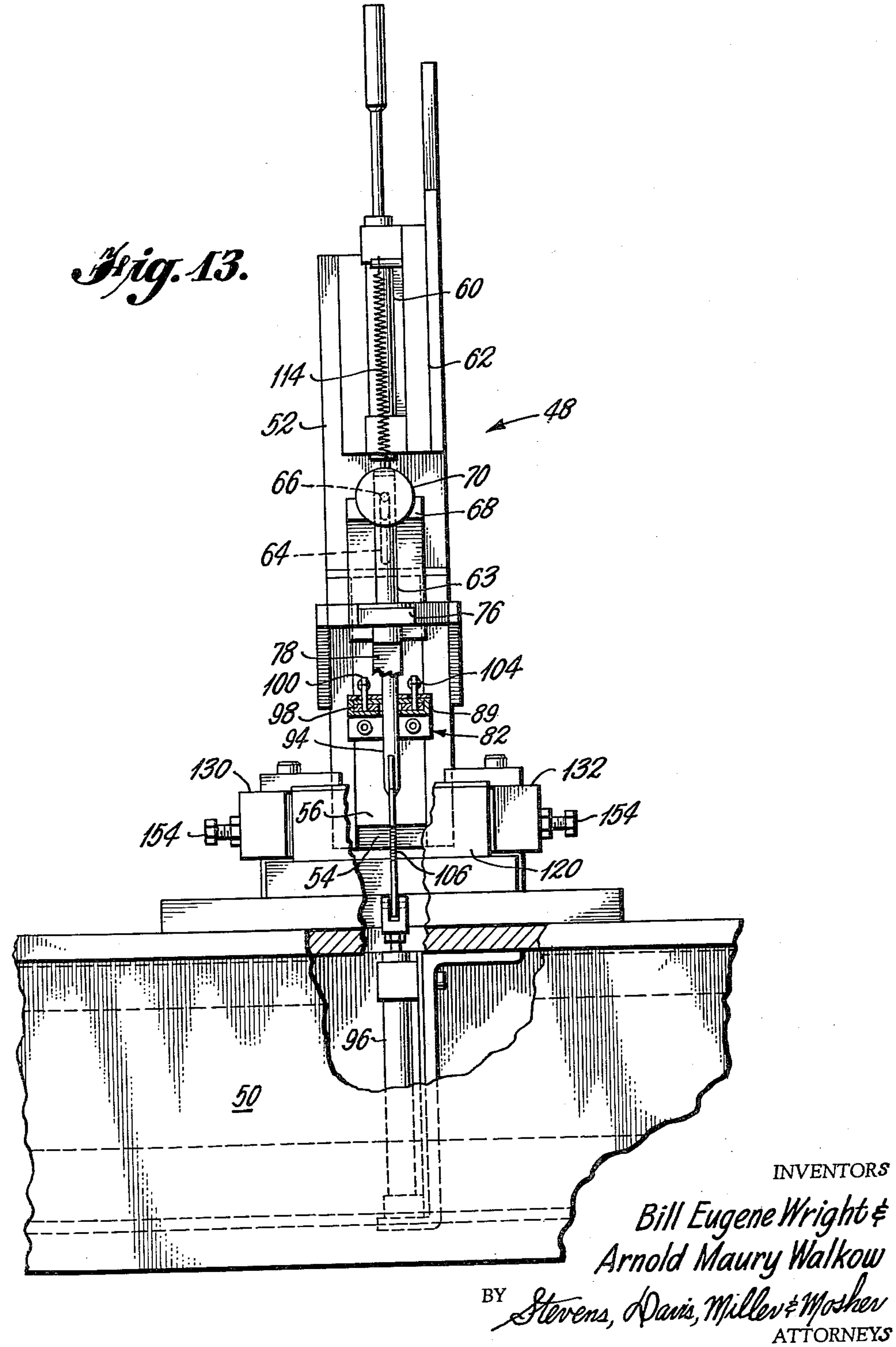
FIGURE 13 is a front elevational view, partly in section, of a lead straightening assembly utilizing the principles of the present invention.
Figure 14:
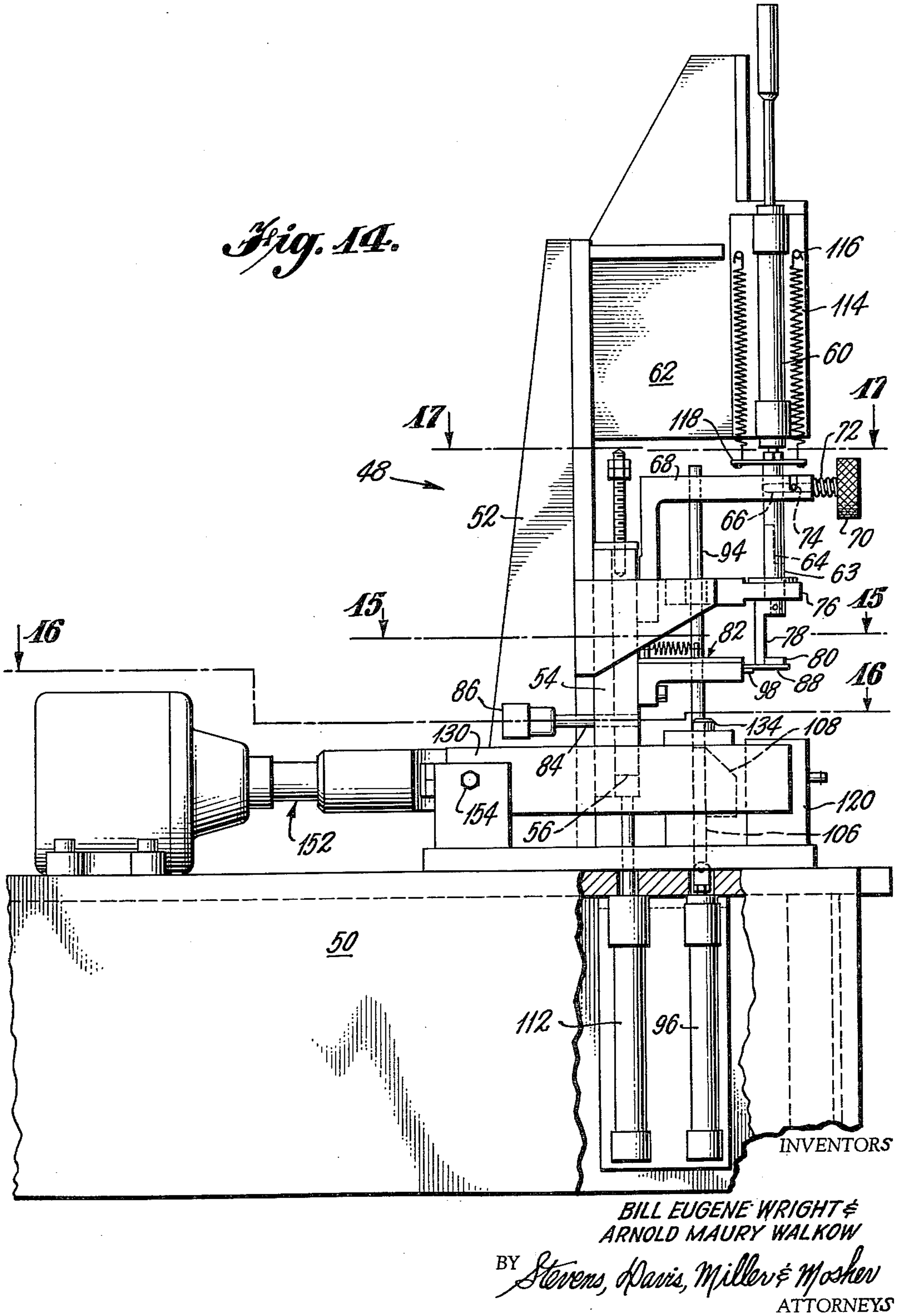
FIGURE 14 is a side view, partly in section, of the assembly of FIGURE 13.

The rod 94, with a configuration as shown in FIGURE 13, serves as a cam for the comb and prong assembly. The comb arms maintain their open position until the cam surfaces 92 contact a flat rod cam portion 106 located on rod 94. The flat cam portion 106 is shaped as a triangular member having a sloping cam surface 108 adapted to engage a cam surface 110 integral with the sliding prong member 98. In this manner, as the rod 94 slides up and down actuated by the power means 96, the comb arms 88 will be pivoted about the pins 90 and, thereafter, the prong member will be actuated in accordance with the relative axial position of the rod. The air piston and cylinder assembly 96 controlling the rod 94 is actuated in synchronization with the rest of the assembly 48, as hereinafter described.

The vertical slide member 56 is coupled to an air piston and cylinder assembly 112 for suitable actuation of the member in accordance with a predetermined schedule, to be synchronized with the movement of the power means 60 and 96, and with the power means for a lead straightener device as hereinafter described. The header push rod 63 is biased by a number of springs 114 each fixed at one end 116 to the bracket member 62 and at the other end to a member 118 attached to the header push rod 63. Thus, any downward movement of the header push rod will be resisted by the plurality of springs until overcome by the force of the air piston and cylinder assembly 60. The other end of the rod 63 is provided with an extension suitable for attaching thereon movement limiting means, such as a limit switch, or the like.

Directly beneath the push rod 63 is mounted a lead straightener 120 supported on the frame structure 50 and provided with indents 122, substantially similar in configuration to the indents 36 shown in FIGURE 8 of the preferred embodiment. The indents 122 operatively coact with fingers 124 integral with oppositely acting spring biased ram members 126 and 128 provided within the straightener 120. The ram members, having ends slightly protruding from the ends of the straightener, are operatively associated with a pair of swivel arms 130 and 132 pivoted about pins 134 and 136, respectively. Swivel arm ends 138 and 140 are in operative association with the ram members 126 and 128, respectively, while the other ends of the swivel arms are pivotly coupled to a linkage mechanism 150 connected to an actuating means 152, such as an air clamp, hydraulic piston and cylinder assembly, or the like.

Limit means 154 are provided in association with the swivel arms to control the movement of the arms about the pivot pins 134 and 136. The actuating means 152 are synchronized with the other power means, such as the air piston and cylinder assemblies 60, 96 and 112, and with the switch means 86 controlling the actuation of the pin 84 to lock or unlock the sliding member 56 within the vertical member 54. It should be obvious that the illustrative embodiment 48 of the present invention can be provided with suitable control mechanism to synchronize the various movements of the comb and prong assembly so that the various steps of straightening the leads can be performed automatically. To facilitate the operation of the lead straightener, the ram members 126 and 128 are shown biased by springs 129 to an open position when not acted upon by the swivel arm ends 138 and 140.

In the operation of the illustrative embodiment 48, the operator loads the transistor in the holder 80, in the same manner shown in FIGURE 1, and then energizes the electrical control circuit, not shown, by any suitable means, such as a foot or hand-operated switch, or the like. The air piston and cylinder assembly 96 is actuated to drive the rod 94 upwards. As shown in FIGURE 15, movement of the rod serves to close the combs by bringing the flat portion 106 in contact with the cam surfaces 92 of the comb arms 88. Further upward actuation of the rod forces the cam portion 108 of the rod to push the prong outwardly through a camming action with the surface 110 of the prong. Thereafter, the action of the comb arms forces the leads into the indent portion, while the prong is forced through the leads in the same manner as shown in FIGURES 6 and 7 of the preferred embodiment.

The comb and prong assembly 82 then combs down the leads of the transistor by axial movement of the sliding member 56 through the operation of the air piston and cylinder assembly 112. The holder 80 remains in place during the combing operation since biased by the springs 114. As the comb and prong assembly 82 approaches the ends of the transistor leads, the bracket assembly 68, also attached to the slide 56, engages the header push rod slot 64, through the pin 66 and commences to pull the transistor down along with the comb and prong assembly.

The comb and prong assembly 82 stops when it is very near to the surface of the lead straightener 120. At the time of stopping, the very short portion of the transistor leads which project from the comb and prong assembly have entered the lead straightener. The bottoming of the comb and prong assembly 82 initiates the downward driving of the holder 80, thereby further inserting the transistor leads in the device 120. During the lead insertion process, the combs open and the prong is retracted due to a downward movement of the rod 94 causing the withdrawal of the cam portions 106 and 108 from the assembly 82. The holder 80 proceeds to move until it is bottomed on the top surface of the device 120.

At this point, the linkage 150 driven by the air cylinder 152 is actuated and the ram members 126 and 128 move inwardly until the leads are squeezed between the indents 122 and the fingers 124. After a time interval, the swivel arms release the ram members which are biased by springs 129 to an open position, and the upward movement of the holder 80 pulls the transistor out of the lead straightener. At the same time, the comb and prong assembly returns to the starting position as shown in FIGURE 13. The transistor with straightened leads is then removed from the holder 80.

It should be understood, of course, that the foregoing disclosure relates to only a preferred embodiment of the invention and that it is intended to cover all changes and modifications of the examples of the invention herein chosen for the purposes of the disclosure, which do not constitute departures from the spirit and scope of the invention as set forth in the appended claims.

What is claimed is:

1. A transistor lead straightening device having a holder supporting the transistor thereon, a prong member slidable in a plane parallel to the supporting plane of the holder, comb means slidable in a plane parallel to the plane of said prong and having a plurality of lead indents corresponding to the number of leads on the transistor, means for actuating said prong member and said comb means in sequential order to place the leads in a predetermined lead orientation pattern, a lead receptacle, means for axially actuating said holder to insert the leads in their predetermined pattern into said receptacle, and means operatively within said receptacle for straightening the leads.

2. A transistor lead straightening device having a holder means for securing the transistor in a predetermined position, a number of comb means operatively coacting with said holder means to place the leads in a predetermined lead orientation pattern, prong means operatively associated with said comb means to separate the leads into the predetermined pattern, a lead straightener, means for vertically actuating said comb and said prong means into the vicinity of said lead straightener, means for moving said holder downward along the vertical axis of the actuated comb and prong means to insert the leads into said straightener, and punch and die means integral with said straightener for partly deforming each of the leads into a substantially triangular cross-sectional deformation to permanently straighten each lead in all directions.

3. A transistor lead straightening device adapted for use with a suitable receptacle, said device including a comb and prong assembly, holder means supporting the transistor and operatively associated with said assembly, means for actuating said assembly to place the leads in a predetermined orientation pattern, means for actuating said holder to insert the leads within the receptacle, means operative within said receptacle for straightening the leads, and means to retract the straightened leads from the receptacle.

4. A method of inserting transistor leads into a lead straightener to permanently straighten them, comprising the steps of mounting the transistor into a holder, combing the leads into a lead orientation pattern, spreading apart the leads of the transistor by sliding a prong member therethrough, vertically aligning the oriented leads with the lead straightener, inserting the leads into the straightener, straightening the leads permanently by applying a force which exceeds the elastic limit parallel to the axis of the leads, raising the leads from the straightener, releasing the leads from about the prong member, and removing the transistor from the holder in preparation to mounting another in its place.

5. A transistor lead straightening device comprising a movable holder supporting a transistor with appending leads, a pivoting comb structure operatively associated with said holder, a slidable prong member operatively coacting with said comb structure to arrange the leads into a predetermined lead orientation pattern, a lead straightener, means axially actuating said comb structure and said prong member to place the lead ends adjacent said lead straightener, means axially actuating said holder to insert the leads into said straightener and to withdraw the leads after being straightened.

6. A lead straightening device comprising a holder for supporting an element having leads apending therefrom generally in a given direction, prong means movable in a plane perpendicular to said direction, comb means movable in a plane perpendicular to said direction, means for moving said prong means and said comb means in said planes to dispose said leads in a predetermined pattern, a lead receptacle, and means for moving said holder relative to said receptacle in said direction to insert said leads in said receptacle, said receptacle including means operative when said leads are inserted therein for straightening said leads.

7. A lead straightening device comprising a holder for supporting an element having leads appending therefrom generally in a given direction, prong means movable in a plane perpendicular to said direction, comb means movable in a plane perpendicular to said direction, means for moving said prong means and said comb means in said planes to dispose said leads in a predetermined pattern, a lead straightener, means for moving said prong means and said comb means in said direction to place the lead ends adjacent said lead straightener, and means for moving said holder relative to said lead straightener to insert the leads into said straightener and to withdraw the leads after straightening.

8. A method of straightening transistor leads comprising the steps of mounting the transistor into a holder, spreading and combing the leads into a predetermined orientation pattern, aligning the oriented leads with a lead straightener, inserting said leads into said straightener and applying a force to said leads which exceeds the elastic limit parallel to the axis of said leads, thereby to straighten and slightly deform said leads.

References Cited in the file of this patent

UNITED STATES PATENTS

| | | |
|---|---|---|
| 1,760,629 | Brindle | May 27, 1930 |
| 1,816,683 | Ledig et al. | July 28, 1931 |
| 2,387,074 | Hroch | Oct. 16, 1945 |
| 2,444,026 | Bartelheim et al. | June 29, 1948 |
| 2,450,974 | Mallina | Oct. 12, 1948 |
| 2,737,917 | Steele | Mar. 13, 1956 |
| 2,825,368 | Kuba | Mar. 4, 1958 |
| 2,878,841 | Peterson et al. | Mar. 21, 1959 |
| 2,920,661 | Drukker | Jan. 12, 1960 |
| 3,028,886 | Drukker | Apr. 10, 1962 |